United States Patent [19]

Lloyd

[11] 3,868,508

[45] Feb. 25, 1975

[54] CONTACTLESS INFRARED DIAGNOSTIC TEST SYSTEM

[75] Inventor: Raymond A. Lloyd, Laurel, Md.

[73] Assignee: Westinghouse Electric Corporation, Pittsburgh, Pa.

[22] Filed: Oct. 30, 1973

[21] Appl. No.: 411,110

[52] U.S. Cl. .................. 250/330, 250/333, 250/338

[51] Int. Cl. .............................................. G01j 5/10

[58] Field of Search ........... 250/252, 330, 333, 334, 250/338

[56] References Cited

UNITED STATES PATENTS

| | | | |
|---|---|---|---|
| 2,895,049 | 7/1959 | Astheimer et al. | 250/316 |
| 3,283,148 | 11/1966 | Schwarz et al. | 250/252 |
| 3,798,366 | 3/1974 | Hunt et al. | 250/334 X |

OTHER PUBLICATIONS

Barnes Infrared Camera, Bulletin 12–600, Barnes Engineering Co., May 1963, 12 pgs.

*Primary Examiner*—Archie R. Borchelt
*Attorney, Agent, or Firm*—J. B. Hinson

[57] ABSTRACT

A system for checking the operational status of individual members of a class of electric circuits is disclosed. The operational status of the circuit being inspected is determined by comparing the infrared radiation patterns of the circuit being inspected with the infrared patterns radiated by a similar circuit known to be free of operational defects. An infrared TV camera is focused on a circuit known to be free of defects. The TV signal is sampled and the samples are digitized to generate a series of digital numbers which are stored in a memory. The TV camera is then focused on the circuit to be inspected and the TV signal is sampled and digitized to generate a second series of numbers which are also stored in a memory. Corresponding members of the first and second series of numbers are then compared by a digital computer to determine areas of the circuit board in which the intensity of the infrared radiation is abnormal. Any abnormal infrared radiation is analyzed to determine if the abnormality is significant. A signal is generated indicating that the circuit is defective if a significant abnormality is found.

9 Claims, 6 Drawing Figures

LEGEND:
$ = 1
+ = 2
— = 3
■ = 4
BLANK = 5

LEGEND:

$ = 1

+ = 2

− = 3

■ = 4

BLANK = 5

LEGEND:

# = 1
+ = 4
− = 3
■ = 2
BLANK = 0

LEGEND:
$ = 1
+ = 2
− = 3
■ = 4
BLANK = 5

CONTACTLESS INFRARED DIAGNOSTIC TEST SYSTEM

BACKGROUND OF THE INVENTION

1. Field of the Invention

The invention relates to testers and more particularly to contactless testers utilizing infrared TV cameras to compare the infrared radiation patterns of a circuit known to be free of defects to the infrared radiation pattern generated by the circuit to be tested.

2. Discussion of the Prior Art

Several articles and papers have been presented on the theoretical feasibility of using infrared in a test system to determine the integrity of electric circuits. A few of these systems have actually been built. One limitation of these systems has been in infrared scanning techniques that were used to generate the thermal profile of the subject under investigation. With these prior art systems a profile was obtained by attaching the subject device (usually a printed circuit board) to the surface of an X-Y positioner and aligning the start point of the area to be scanned to the focal point of the infrared detector. Stimulus is applied, and the device is moved in a scan trajectory relative to the focal point of the infrared detector by the X-Y positioner. At the end of the trajectory scan, the subject is indexed and scanned in the same plane. This method is continued until the total surface of the subject has been scanned by the infrared detector. The X-Y positioner is controlled by a series of stepping motors that typically has a maximum of 100 steps per second, with each step consisting of 10 mils of motion. The results of this method of scanning were long time periods required to scan the subject. A typical example is a small 4.5 × 4.5 inch printed circuit board. To scan 4.5 inches at maximum stepping rate would require 4.5 seconds (This is for one plane only). This would have to be repeated 450 times to scan the second plane or a total of 2,025 seconds, to scan the total surface of the board. Typical prior art systems are discussed in the following articles: (A) "Infrared for Electronics Equipment Diagnosis" by J. F. Stoddard. Raytheon Co. August, 1968; (B) "An Infrared Tester for Printed Circuit Boards and Microcircuits" by R. W. Jones. Autonetics Division of North American Rockwell Corp. August, 1968.

SUMMARY OF THE INVENTION

The invention includes apparatus for detecting infrared radiation generated by an electronic circuit and for analyzing this radiation to determine if the circuit is operating properly. The basic procedure utilized is to select a properly operating member of the class of circuits to be tested as a reference circuit. The reference circuit is positioned in a fixture and normal bias voltages and selected input signals are coupled to the reference circuit. The surface of the reference circuit is examined by an infrared TV camera to generate a video signal proportional to the infrared radiation emitted by the reference circuit. The video signal is sampled and each sample is digitized to generate a first array of digital numbers with the magnitude of each of these numbers being proportional to the infrared radiation emitted from a specific portion of the circuit. These digital numbers are then stored in a digital memory.

The circuit to be tested is then placed in the fixture and provided with bias and input signals substantially identical to those previously applied to the reference circuit. The surface of the circuit under test is then examined by the infrared TV camera to generate a second video signal proportional to the infrared radiation from the circuit under test. This second video signal is sampled and each sample is digitized by an analog-to-digital converter to generate a second array of digital numbers with the magnitude of each of these numbers being proportional to the magnitude of the infrared radiation emanating from a specific point of the circuit being tested. These numbers are also stored in the digital memory.

A digital processor reads the first and second array of digital numbers from the memory and compares corresponding elements of the first and second arrays to generate a third array of digital numbers. Each element of the third array is proportional to the difference between corresponding member of the first and second arrays. This third array of numbers is then analyzed to indicate areas where the infrared radiation from the circuit under test is significantly different from the infrared radiation from the corresponding portion of the reference circuit. The existence of significant differences indicates that the circuit under test is not functioning properly.

If the circuit under test is found to be faulty the infrared radiation patterns can be further analyzed to actually determine or aid in determining which component of the circuit under test may be faulty. The degree to which this analysis can be carried will in general depend on the type of circuitry being tested. In the disclosed system the operational parameter used to detect improper operation in infrared radiation. Other parameters such as magnetic field may be used by substituting suitable magnetic detecting means for the infrared camera.

DETAILED DESCRIPTION OF THE INVENTION

Figure 1:
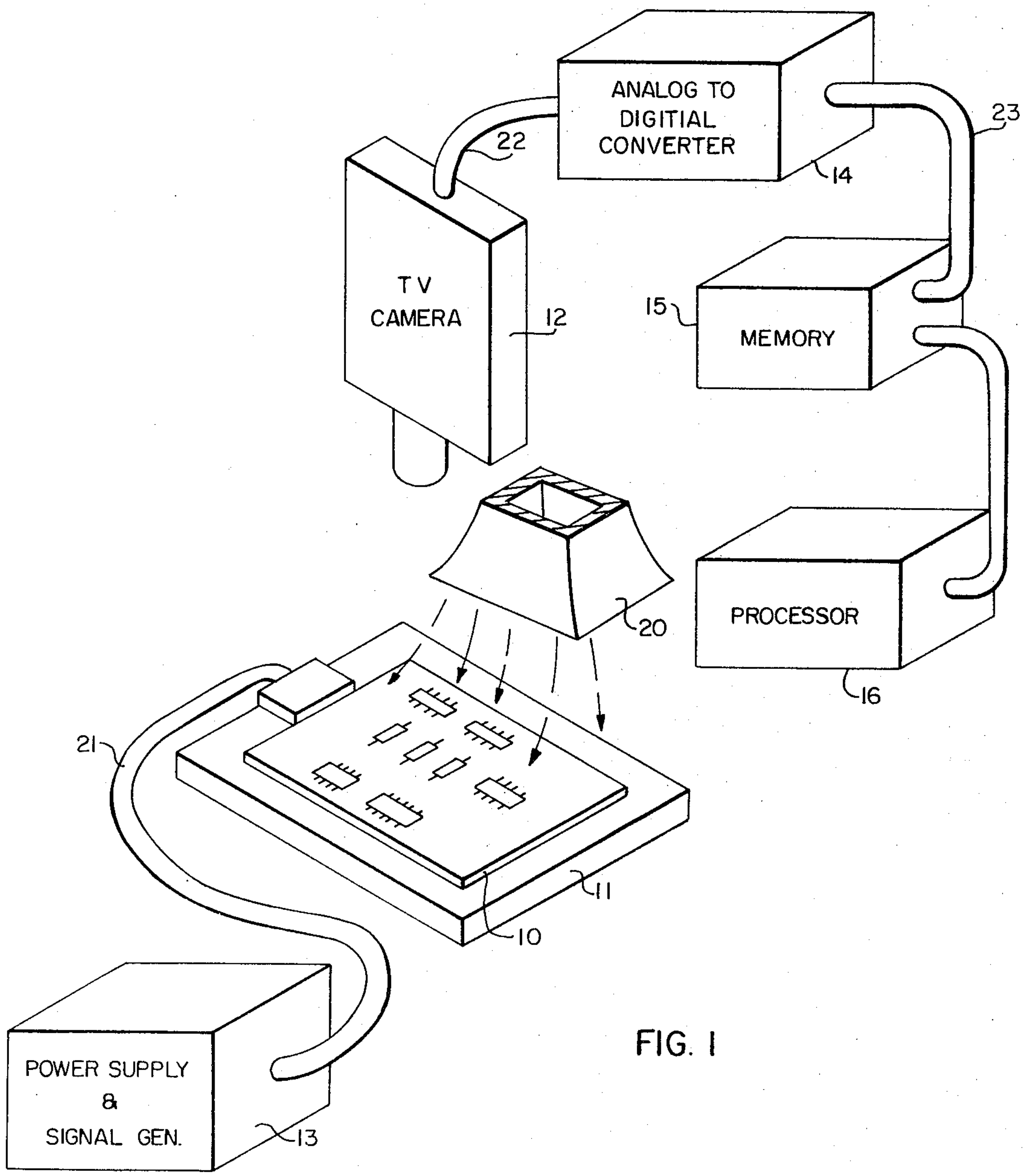
FIG. 1 is a drawing illustrating the functional components of the system.

A diagram illustrating the components of the preferred embodiment of the system is shown in FIG. 1. The circuit 10 to be tested is positioned on a fixture 11. The fixture 11 is designed such that the circuit board 10 is supported in a predetermined position with respect to an infrared TV camera 12. Bias and test input signals are provided to the circuit board 10 by a power supply and signal generator 13. The video signals generated by the TV camera 12 are sampled and digitized by an analog-to-digital converter 14 to generate an array of numbers indicative of the infrared radiation emanating from the surface of the circuit board under test. The digital numbers generated by the analog-to-digital converter are stored in a memory 15. The contents of the memory 15 are then analyzed by a processor 16 to generate signals indicative of the operational status of the circuit board under test 10. Air from an air duct 20 is passed over the circuit board 10. Air may be supplied to air duct 20 by any convenient means. This prevents the infrared radiation patterns emitted by a circuit board from becoming distorted due to heating of the air masses adjacent the circuit components.

In operation a circuit board 10, which is a member of the class of circuits to be tested and known to be in proper operating condition is positioned in the fixture 11. This circuit is referred to as the reference circuit. The power supply and signal generator 13 is coupled to the reference circuit by a cable and connector assembly 21. The air supply (not shown) is energized to provide a constant air flow through the air duct 20. The TV camera, the analog-to-digital converter 14, the memory 15, and the processor 16 are then energized. The infrared TV camera 12 is focused on the circuit board 10. The video output signal of the TV camera is coupled to the analog-to-digital converter 14 by a cable 22. The analog-to-digital converter 14 samples and digitizes the video signal generated by the TV camera to generate a first array of digital numbers, illustrated by symbols in FIG. 2. Suitable techniques for sampling and digitizing TV signals are well known in the prior art.

Figure 2:
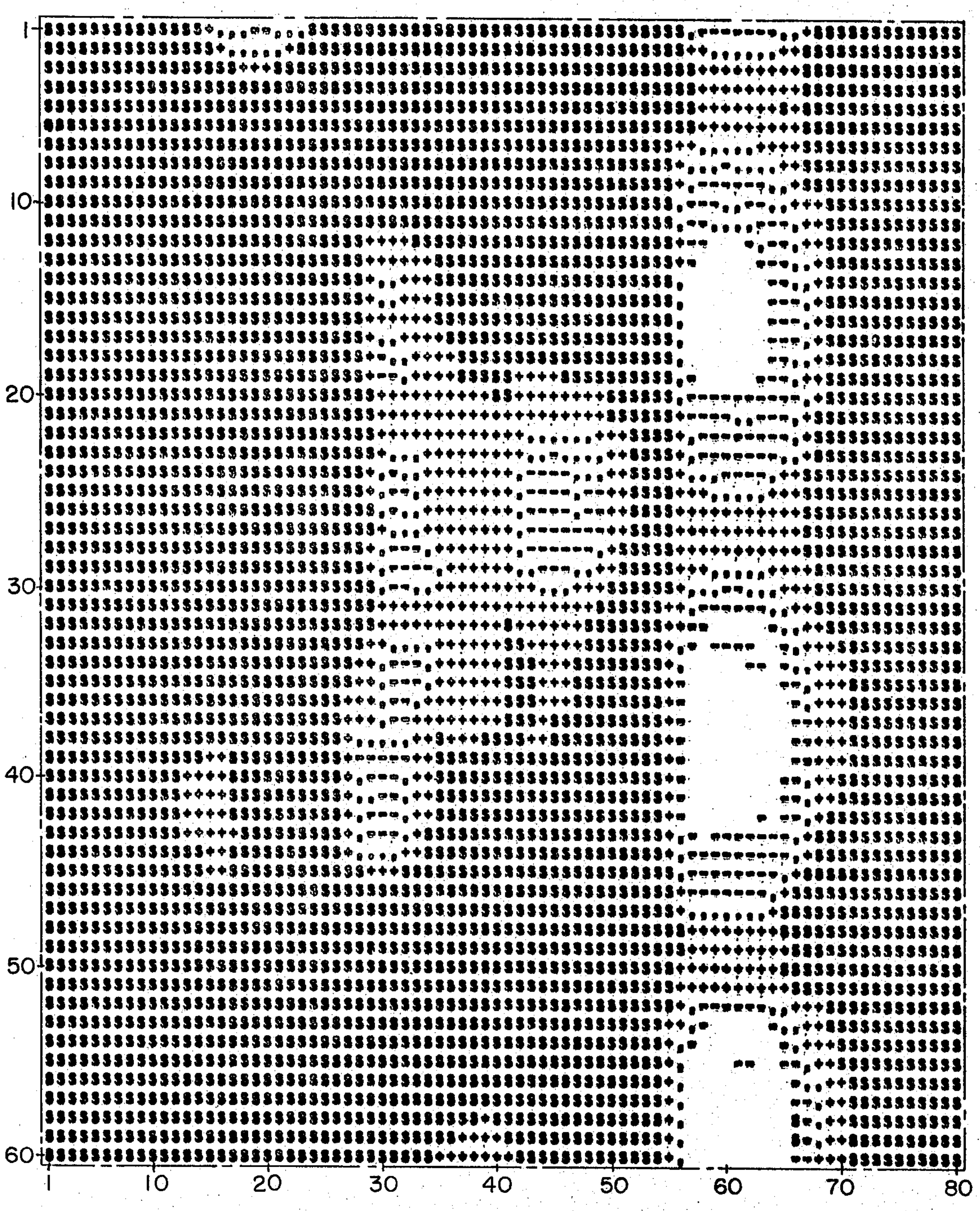
FIG. 2 is a typical array generated by scanning the reference circuit.

Symbols are used instead of numbers in all of the illustrations. This aids in visually analyzing the arrays of illustrated in FIG. 2 of subsequent drawings. The array illustrated in FIG. 2 is indicative of the point by point infrared radiation emanating from the circuit board 10. Since the circuit board 10 is known to be in proper operating condition this array of numbers will be used as reference data and compared to similar data generated by examining circuit to be tested. A five level code has been found to provide sufficient resolution. The five level code also permits a simple analog-to-digital converter to be used and limits the number of bits in the digital data word to three. Reducing the number of bits in the data word reduces the memory and data processing requirements.

Figure 3:
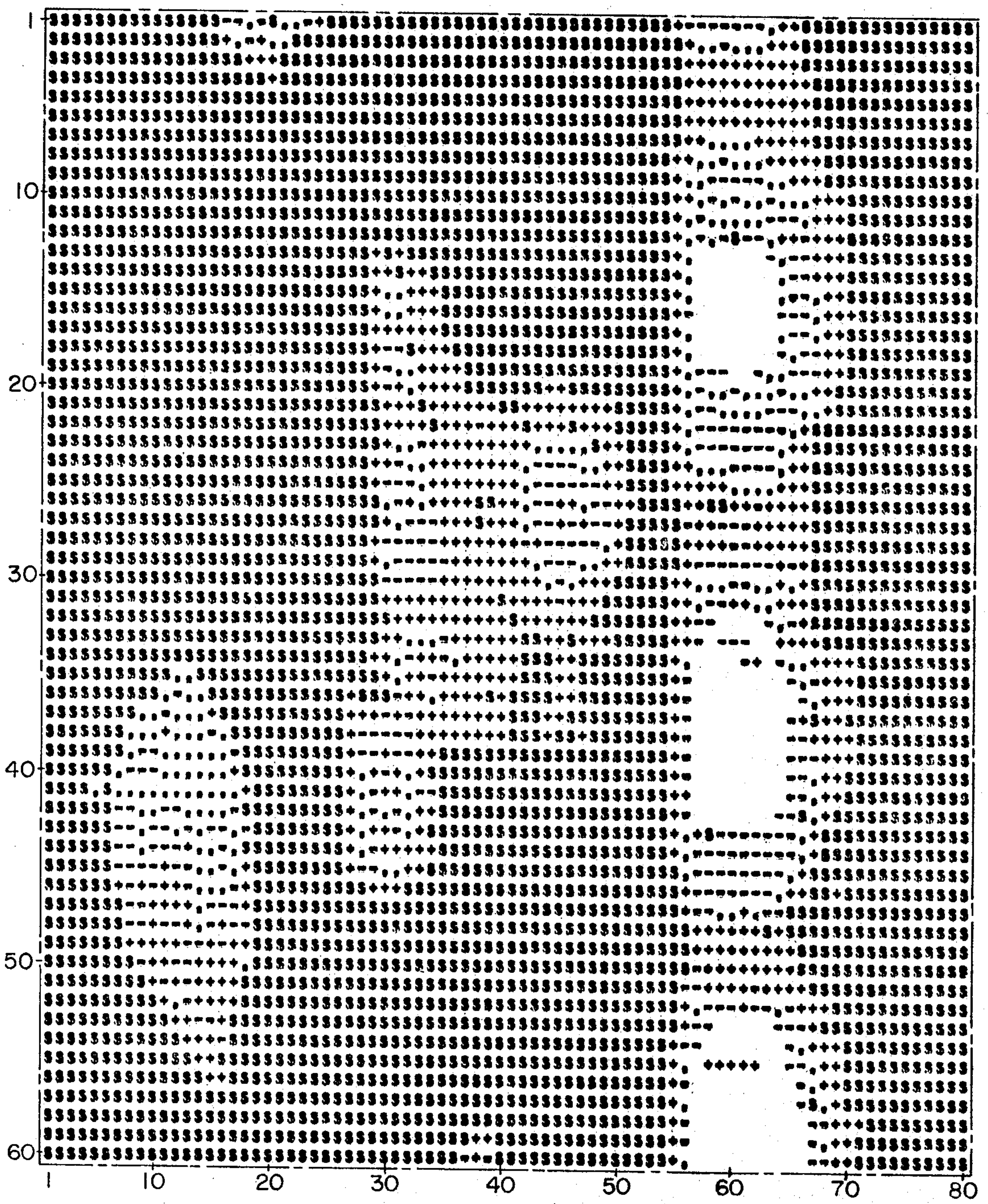
FIG. 3 is a typical array generated by scanning the circuit under test.
Figure 4:
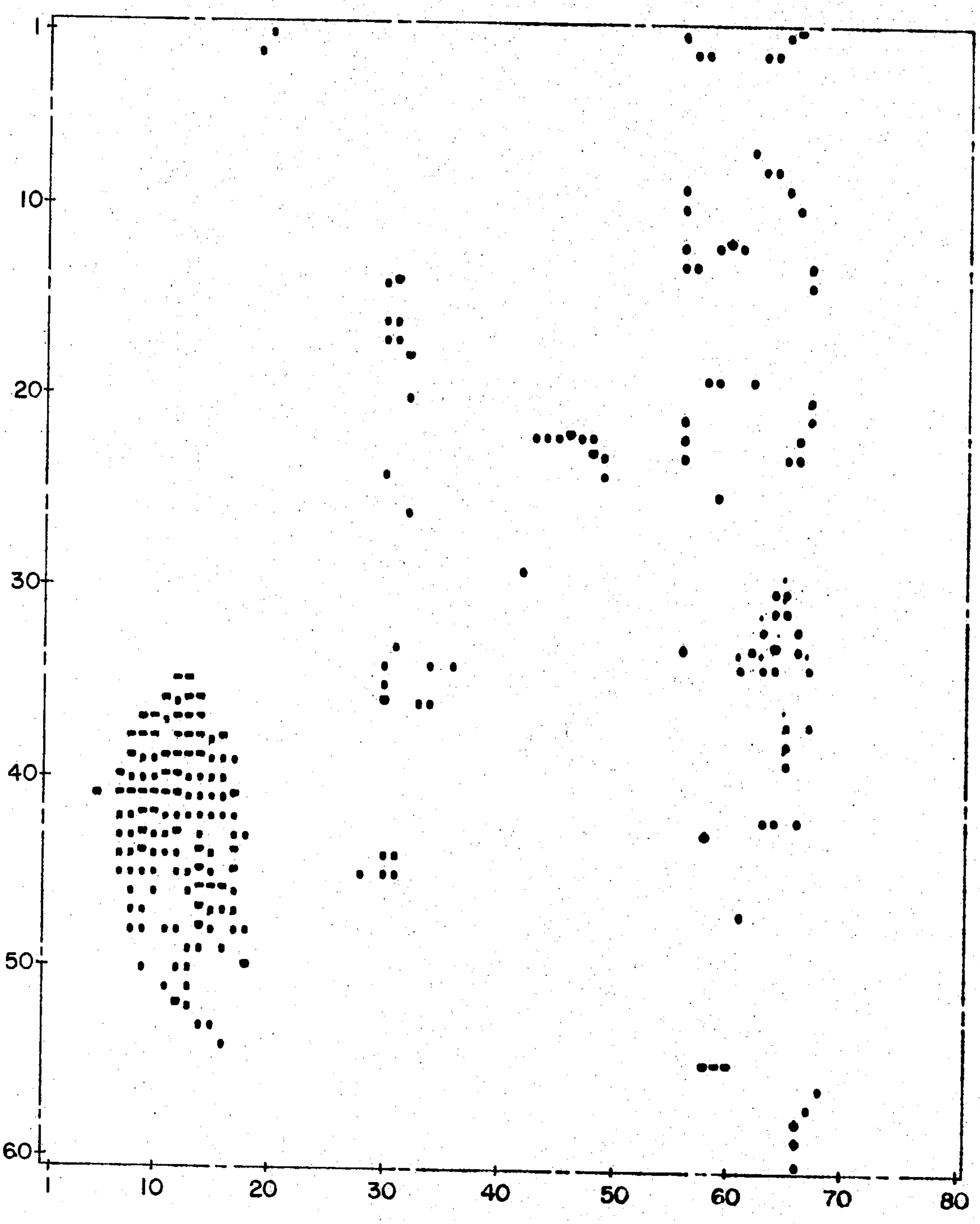
FIG. 4 is an array proportional to the difference between the arrays illustrated in FIGS. 2 and 3.

The reference board used to generate the first array of numbers is now removed from the test fixture 11 and a circuit to be tested is placed in the fixture 11. This circuit board is coupled to the power supply and signal generator 13 by the cable assembly 21. The TV camera 12 is focused on the circuit to be tested and a second array of numbers is generated by sampling and digitizing the video output signals of the TV camera 12. These numbers are stored in the memory 15, as previously described. The second array of numbers is illustrated by symbols in FIG. 3. The digital processor 16 reads the first and second arays of numbers illustrated in FIGS. 2 and 3 and subtracts each element of the second array from the corresponding element in the first array to generate a new array of number indicative of the difference between the two arrays. This new array of numbers is illustrated in FIG. 4.

Figure 5:
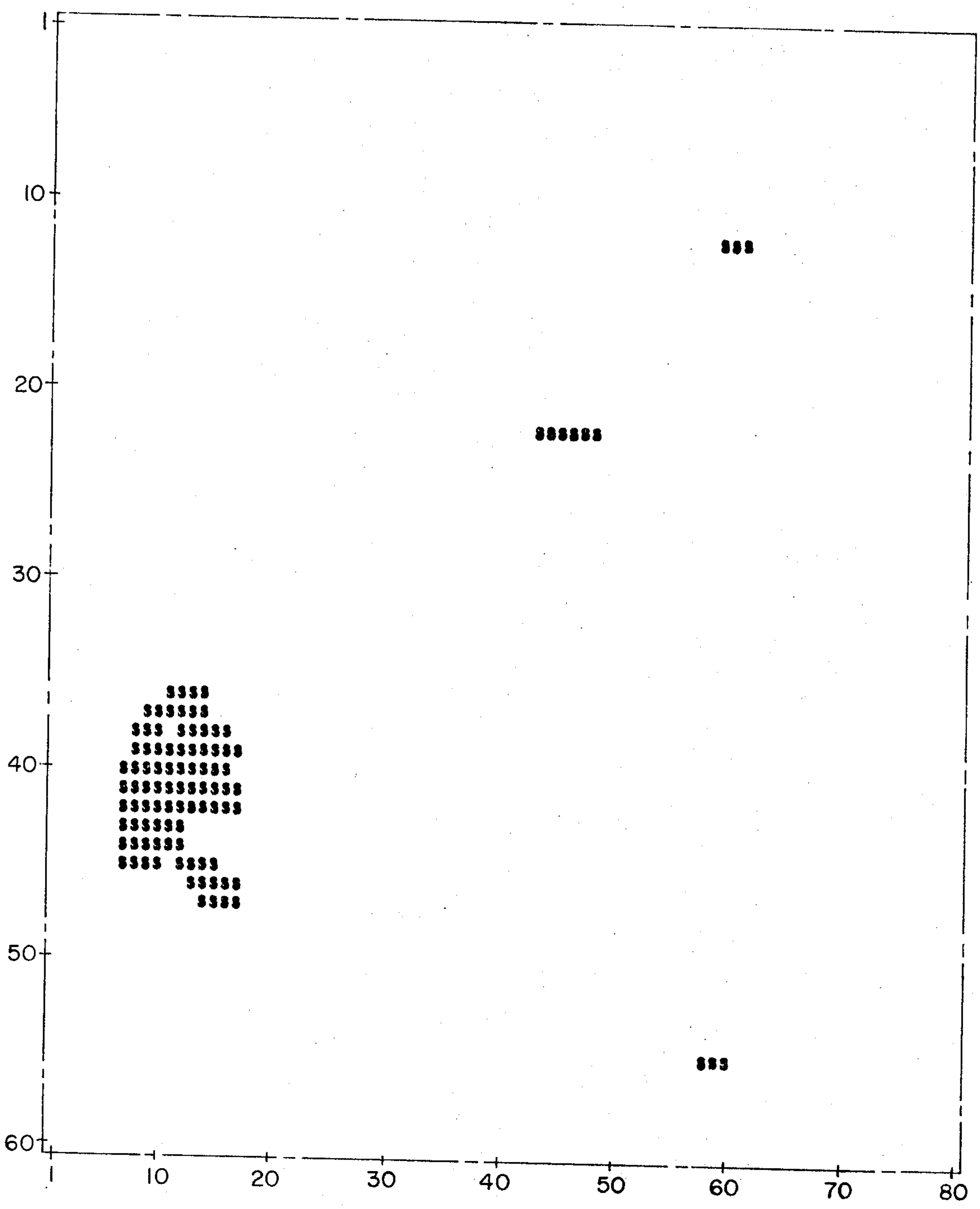
FIG. 5 is an array indicating which of the elements of the array illustrated in FIG. 4 are significant.
Figure 6:
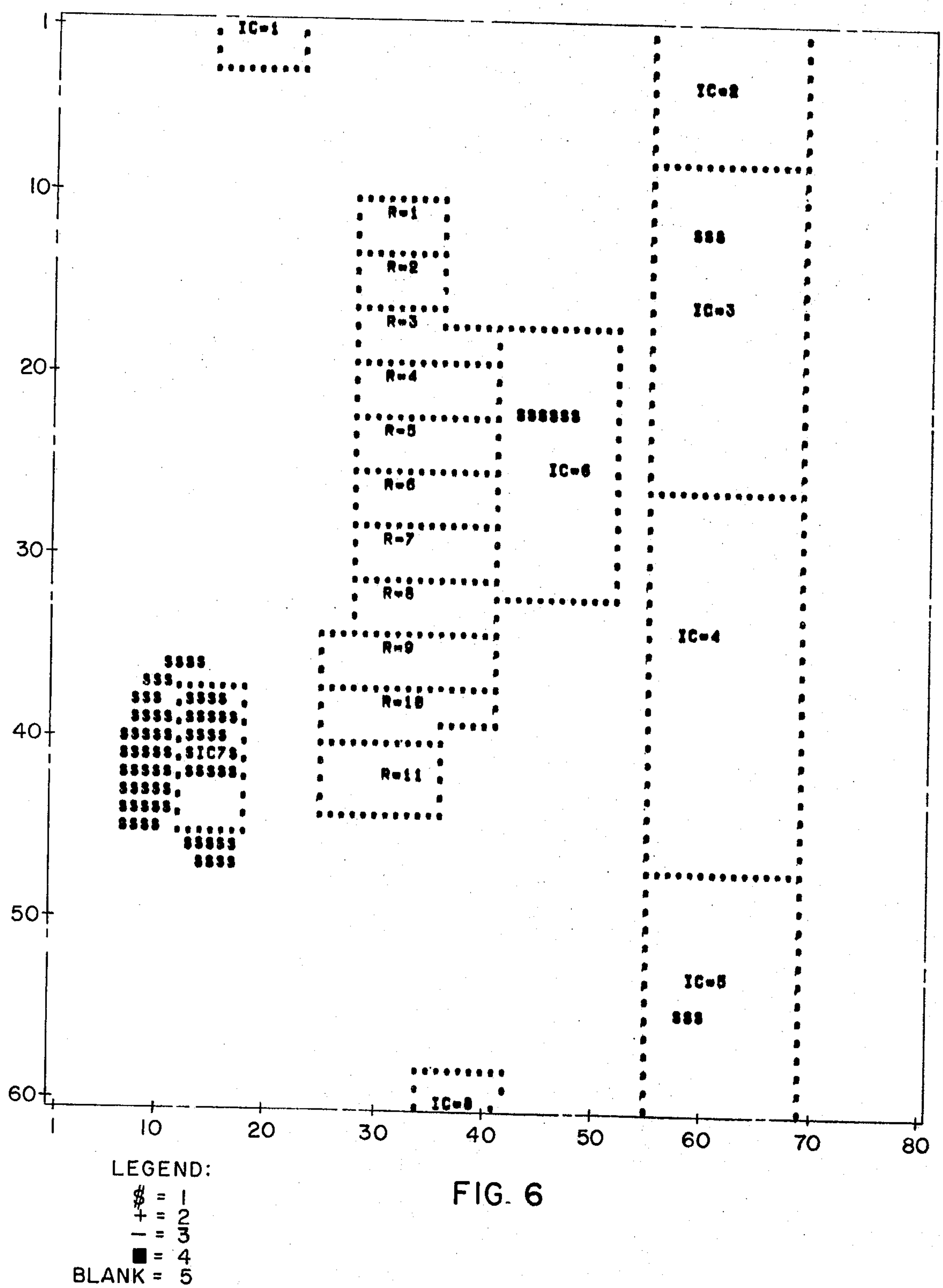
FIG. 6 is the array illustrated in FIG. 5 superimposed on an outline of the circuit component comprising the circuit being tested.

The differences in infrared radiation emanating from various areas of the circuit board can result from either normal variation in the components comprising the circuit or abnormal operating conditions. Therefore it is necessary to analyze the differences illustrated in FIG. 4 to determine which of these differences are significant. One statistical criteria found to be useful in analyzing the data is to analyze the array illustrated in FIG. 4 on a line-by-line basis in the horizontal direction. Only those areas where there is a difference in at least three adjacent elements are considered to be significant. The array of numbers illustrated in FIG. 4 was processed in this manner. A dollar sign was used to indicate points of the array which meet this criteria and the resulting array is shown in FIG. 5. The array of FIG. 5 was superimposed on a line outline of the components comprising the circuit being tested. The result is shown in FIG. 6. With the outer dimensions of each circuit component being indicated by data arranged in segments of a straight line.

The circuit tested to generate the arrays used in this application consisted of integrated circuits and resistors. The integrated circuits are identified in FIG. 6 by the symbol IC followed by an identification number. The resistors are similarly identified by the symbol R.

It should also be noted that the circuit being tested can be examined in parts. This is illustrated in FIG. 6 by the fact that only portions of IC1, IC2 and IC5 are within the view of the camera.

FIG. 6 indicates that the major difference between the infrared radiation patterns of the reference circuit and the circuit being tested is due to an integrated circuit, IC7 illustrated in the lower lefthand corner of FIG. 6. This difference was in fact generated by introducing a fault in integrated circuit IC7. The difference in the radiation from integrated circuits IC6, IC3 and IC5 was the result of a slight alteration in the operating characteristics of this integrated circuit due to the fault introduced into integrated circuit number 7. This clearly illustrates that a faulty circuit can be expected to result in an abnormal infrared radiation pattern and that these abnormalities can be analyzed to determine which component is causing the problem.

The most practical way of operating the system and in fact the method used to generate the arrays of numbers illustrated in FIGS. 2–6 was to use a general purpose digital computer as the processor. The arrays illustrated in FIGS. 2 through 6 may be generated by a printer controlled by the computer. The digital computer was also used to control the analog-to-digital converter 14. The memory 15 was a part of the computer. The actual program utilized by the experimental system, written in Fortran, is shown below.

```
      COMMON IN1(80,60),IN2(80,60),M(80)
      LL=12
C
C  OPEN DATA CHANNAL
C
      CALL FOPEN(13,"RDATA")
      WRITE(LL,150)
C
C  READ,CONVERT & PRINT REFERENCE DATA
C
      DO 40 J=1,60
      READ(13,100)(IN1(I,J),I=1,80)
      CALL CONVERT(1,J)
   40 CONTINUE
      WRITE(LL,151)
```

```
C
C   READ CONVERT, & PRINT TEST DATA
C
        DO 50 J=1,60
        READ(13,100)(IN2(I,J),I=1,80)
        CALL CONVERT(2,J)
  50    CONTINUE
        WRITE(LL,152)
C
C   CALCULATE ABS VALUE OF DIFFERENCES BETWEEN
C   CORRESPONDING ITEMS
C
        DO 80 I=1,60
        DO 70 J=1,80
        IN1(J,I)=IABS(IN1(J,I)-IN2(J,I))
        IF(IN1(J,I) .LE. 1)IN1(J,I)=5
        IF(IN1(J,I) .EQ. 2)GO TO 90
        IF(IN1(J,I) .EQ. 4)IN1(J,I)=2
        GO TO 70
  90    IN1(J,I)=4
  70    CONTINUE
        CALL CONVERT(1,I )
  80    CONTINUE
        WRITE(LL,91)
  91    FORMAT(1H1,'     DATA DESENSITIZED ')
C
C   SCAN FOR STRING OF THREE OR MORE NON NULL ITEMS
C
        DO 1000 I=1,60
        IFLAG=0
        IPT1=1
  200   IF(IN1(IPT1,I) .LT. 5) GO TO 300
        IF(IPT1 .EQ. 80) GO TO 900
        IPT1=IPT1+1
        GO TO 200
 300    ICOUNT =1
        IPT2=IPT1+1
  310   IF(IN1(IPT2,I) .EQ. 5) GO TO 360
        ICOUNT=ICOUNT +1
        IF(IPT2 .EQ. 80) GO TO 350
        IPT2=IPT2+1
        GO TO 310
  350   IFLAG=1
  360   IPT3=IPT2-1
        IF(ICOUNT .LT. 3) GO TO 380
        DO 370 K=IPT1,IPT3
  370   IN1(K,I)=1
        IF(IFLAG .EQ. 1) GO TO 900
        GO TO 384
  380   DO 382 K=IPT1,IPT3
  382   IN1(K,I)=5
  384   IPT1=IPT2
        GO TO 200
  900   CALL CONVERT(1,I)
 1000    CONTINUE
C
C
        WRITE(LL,154)
  154   FORMAT(1H1,'     LAYOUT OVERLAY ')
C       NOW READ IN OUTLINE
        DO 400 J=1,60
        READ(13,110)(IN2(I,J),I=1,80)
  400    CONTINUE
C
C
C
C   COMBINE DESENSITIZED DATA & PATTERN OUTLINE
C
        DO 420 J=1,60
        DO 410 I=1,80
        IF(IN1(I,J) .EQ. 5)IN1(I,J)=' '
        IF(IN1(I,J) .EQ. 1) IN1(I,J)='$'
        IF(IN2(I,J) .NE. '  ')IN1(I,J)=IN2(I,J)
  410    CONTINUE
C
C   PRINT FINAL RESULT
C
        WRITE(LL,120)(IN1(II,J),II=1,80)
```

```
  42Ø    CONTINUE
 11Ø     FORMAT(8ØA1)
 12Ø     FORMAT(1X,8ØA1)
  1ØØ   FORMAT(8ØI1)
  15Ø   FORMAT(1H1,'      DATA SET 1 ')
  151   FORMAT(1H1,'      DATA SET 2 ')
  152   FORMAT(1H1,'      DIFFERENCE-- DATA SET 1-DATA SET 2 ')
        END

        SUBROUTINE CONVERT(N,NN)
        COMMON IN1(8Ø,6Ø),IN2(8Ø,6Ø),M(8Ø)
C
C   THIS SUBROUTINE CONVERTS A LINE OF NUMERIC DATA
C   TO SYMBOLS AND THEN PRINTS IT
C   ARGUMENTS
C   N=ARRAY #
C   NN=LINE #
C
C
        DO 15 K=1,8Ø
        IF(N .EQ. 1) GOTO 3Ø
        KK=IN2(K,NN)
        GO TO 4Ø
  3Ø    KK=IN1(K,NN)
 4Ø     GOTO(1,2,3,4,5)KK
  1     M(K)='$'
        GOTO 15
  2     M(K)='+'
        GOTO 15
  3     M(K)='-'
        GO TO 15
  4     M(K)= ','
        GO TO 15
  5     M(K)=' '
  15     CONTINUE
        WRITE(12,2ØØ)(M(II),II=1,8Ø)
  2ØØ   FORMAT(1X,8ØA1)
        RETURN
        END
```

The system illustrated in FIG. 1 may be assembled from commercially available items. Suitable components are listed by manufacturer and part no. below.

1. The TV camera may be a thermovision Model No. 680 manufactured by AGA Corporation.

2. The analog-to-digital converter may be type No. ADC-H-4B manufactured by Data Systems Corporation.

3. The memory and processor may be combined and be a general purpose digital computer Model No. NOVA 1200 manufactured by Data General Corporation.

The above discussed method for analyzing the video signals may be implemented using analog techniques. Digital techniques were used in the preferred and above discussed system because the current state of hardware development tends to favor digital techniques for applications of this type.

I claim:

1. A method for inspecting a member of a class of related device to determine its operational status, comprising the steps of:

a. scanning the infrared pattern generated by a reference member of said class of related devices with an infrared detector to generate a reference signal indicative of the infrared radiation emitted by said reference member;

b. scanning the infrared pattern generated by the member to be inspected with an infrared detector to generate a test signal indicative of the infrared radiation emitted by said member;

c. comparing said reference and test signals to identify difference therebetween;

d. statistically analyzing said difference to determine if said member to be inspected is operating within prescribed limits.

2. The method defined by claim 1 wherein the infrared pattern generated by said reference member is scanned by focusing an infrared TV camera on said reference member to generate said reference signal.

3. The method defined by claim 2 wherein the infrared pattern generated by said member to be inspected is scanned by focusing an infrared TV camera on said member to generate said test signal.

4. The method defined by claim 3 wherein said reference and test signals are similarly sampled and digitized to generate first and second arrays of digited numbers.

5. The method defined by claim 4 wherein corresponding elements of said first and second arrays of ditital numbers are compared to generate a third array, equal to the difference therebetween.

6. Apparatus for inspecting a member of a class of related devices comprising:

a. means for examining a reference member of said class of related devices to generate reference data by detecting a parameter having a predictable relationship to the operation of members of said class of related devices;

b. means for examining the member of said class of related devices to be inspected to generate test data by detecting said parameter;

c. means for comparing said reference and test data to generate comparison data related to the difference between said reference and test data; and d. means for statistically analyzing said comparison data to determine the operational status by the member being inspected.

7. The apparatus defined by claim 6 wherein said means for examining said reference member and the member to be inspected includes a TV camera.

8. The apparatus defined by claim 7 wherein said reference and test data are generated by sampling and digitizing the video output signal by said TV camera.

9. The apparatus defined by claim 8 wherein said means for statistically analyzing said comparison data includes a digital computer.

* * * * *